United States Patent Office 3,274,161
Patented Sept. 20, 1966

---

3,274,161
POLYMERS OF N,N'-TETRAHYDRO-BIPYRIDYL-BIQUINOLYL AND -BIACRIDYL DICARBOXYLIC ACID DERIVATIVES
Walter E. Kramer, Niles, and Louis A. Joo and Robert M. Haines, Crystal Lake, Ill., assignors, by mesne assignments, to Union Oil Company of California, Los Angeles, Calif., a corporation of California
No Drawing. Original application May 13, 1960, Ser. No. 28,866, now Patent No. 3,147,262, dated Sept. 1, 1964. Divided and this application Jan. 9, 1964, Ser. No. 356,345
5 Claims. (Cl. 260—77.5)

This application is a division of S.N. 28,866, filed May 13, 1960, now U.S. Patent 3,147,262, issued September 1, 1964.

This invention relates to new and useful salts of nitrogen-containing organic acids, particularly the dimetallic salts of dipyridylcarboxylic acids and analogues thereof, and to derivatives of said compounds, such as esters, polyesters, and the like, derived therefrom.

During the period from 1914 to about 1921, there were reported in the literature the results of experimental work by Bruno Emmert on the reactions of pyridine with the alkali metals. Typical reports of this work are found in Berichte, 47, 2598 (1914); 49, 1060 (1916); 50, 31 (1917); 52, 1351 (1919); 53, 370 (1920); and 54, 204 (1921). In these publications, Emmert reported that sodium will react with pyridine to produce a disodium dipyridyl compound. Emmert also reported the formation of similar compounds by reaction of sodium with other aromatic heterocyclic amines, such as quinoline, acridine, and the like. This invention is concerned with the preparation of certain novel intermediates from the alkali-metal dipyridyl compounds and analogues thereof, and is also concerned with the preparation of certain polymers from said intermediates.

One of the objects of this invention is the provision of a novel class of compounds derived from aromatic heterocyclic amines.

Another object of this invention is the provision of novel polymers derived from aromatic heterocyclic amines.

Another object of this invention is the provision of a novel process for the preparation of novel compounds and novel polymers from aromatic heterocyclic amines.

A feature of this invention is the provision of a novel class of compounds of the formula,

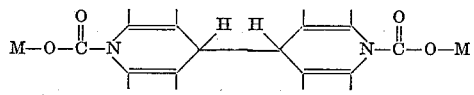

where M is an alkali metal, and the nuclei

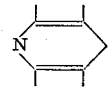

are derived from a heterocyclic aromatic amine.

Another feature of this invention is the provision of novel polymers derived from the N,N-dicarboxylic acids of this invention.

Another feature of this invention is the provision of novel derivatives of the N,N-dicarboxylic acids which are derived from heterocyclic aromatic amines in accordance with this invention.

Another feature of this invention is the provision of a new and improved process for the preparation of N,N-dicarboxylic acids from heterocyclic aromatic amines by reaction with alkali metals and carbonation of the intermediate product.

Other objects and features of this invention will become apparent from time to time throughout the specification and claims as hereinafter related.

This invention is based upon our discovery that certain novel compounds are obtained by reaction of alkali metals, such as sodium, potassium, lithium, etc., and mixtures thereof, such as sodium-potassium alloys, with heterocyclic aromatic amines, such as pyridine, quinoline, acridine, and the like, followed by carbonation of the product diamides. The intermediate diamides which are formed have the formula

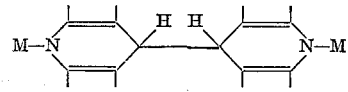

where M is an alkali metal, and the nitrogen-containing nuclei are derived from a heterocyclic aromatic amine. We have found that when the alkali-metal amides, which are formed in the above manner, are reacted with carbon dioxide (preferably in the solid form) at low temperatures, there is formed a dialkali-metal salt of an N,N-dicarboxylic acid derived from the heterocyclic amine. The salt which is formed has the formula,

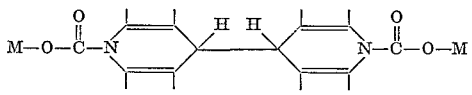

where M is an alkali metal, and the nuclei

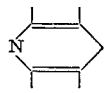

are derived from a heterocyclic aromatic amine. When these salts are acidified with a strong acid, a solid polymer is obtained which has a variety of uses. When these N,N-dicarboxylic acid salts are reacted with polyhalogenated hydrocarbons, polymers are produced which contain repeating functional groups derived from the nitrogen-containing salts and repeating functional groups derived from the halogenated hydrocarbon. Similarly, by reaction with monohalogenated hydrocarbons, it is possible to produce simple esters of the N,N-dicarboxylic acid.

In preparing the novel compounds of this invention, a dispersion of an alkali metal, such as sodium, lithium, potassium, or sodium-potassium alloys, is formed in an inert solvent. The solvent or reaction medium used is preferably a mineral oil, such as a white oil, although other inert solvents can be used, such as hydrogenated aromatic extracts of mineral oils and xylene, ethers, and acetals, such as diethyl ether, dipropyl ether, dioctyl ether, dimethoxyethane, methylal, dimethyl ether of diethylene glycol, etc. When liquid sodium-potassium alloys are used, a mixed sodium-potassium product is obtained and the solvent may be eliminated. The dispersion of the alkali metal in the inert solvent is then added to an aromatic heterocyclic amine, such as pyridine, quinoline, acridine, or derivatives thereof containing only inert substituents, e.g., picoline, lutidine, esters or salts of nicotinic acid, 2-benzylpyridine, 2,3,6-collidine, etc., while maintaining the reaction at a relatively low temperature, e.g., −50° to +50° C., preferably −25° to +10° C. Under these conditions, the alkali metal reacts with the aromatic heterocyclic amine, i.e., adds at the nitrogen atom, with the result that the aromatic amine dimerizes and there is formed a dialkali-metal amide of the aromatic amine dimer. In the case of pyridine and sodium, the reaction is as follows:

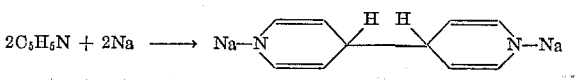

After the alkali-metal diamide of the aromatic amine is formed, it is then reacted with carbon dioxide in solid or gaseous form to produce a dialkali-metal salt of the formula,

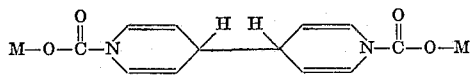

where M is an alkali metal, and the nuclei

are derived from the pyridine (or other aromatic heterocyclic amine). It is preferred to carry out the reaction using solid carbon dioxide in order to maintain the temperature of reaction low enough to prevent the formation of undesired by-products. The reaction with carbon dioxide is preferably carried out in the temperature range from $-100°$ C. to $+50°$ C. The reaction can be carried out with cool gaseous carbon dioxide, or with solid carbon dioxide which maintains the reaction at a low temperature. The alkali-metal salt which is formed by reaction of the dialkali-metal diamide with carbon dioxide is stable and can be recovered in relatively pure form from the reaction mixture by filtration, washing, and drying techniques. The product which is produced is useful as an intermediate in the preparation of other nitrogen-containing compounds, and upon acidification is converted into a polymer having a variety of uses; or it may be reacted with aliphatic halides to produce esters or polyesters.

The following non-limiting examples are illustrative of this invention.

EXAMPLE I

A sodium dispersion in white oil was prepared by dispersing 11.5 g. of sodium in 150.0 g. of white oil. After the dispersion had been cooled at room temperature, 240 ml. of anhydrous pyridine were added, whereupon the solution turned yellow. Next, the solution was cooled to $-25°$ C., and after being stirred at this temperature for 25 minutes, the mixture was poured over solid carbon dioxide. A reaction took place which produced a sodium salt which precipitated in the reaction liquid. The resulting sodium salt was filtered from the liquid phase, and was washed with ether, after which it was dissolved in water, and the water solution was washed several times with ether to remove residual oil and pyridine. Then the aqueous solution was poured into a large excess of isopropanol, whereupon a white precipitate formed. This precipitate was recovered by filtration, washed with isopropanol and ether, and dried. The product was analyzed for sodium and hydrogen content to determine the chemical composition thereof. From the reactants used, it was assumed that the product was probably disodium $\gamma,\gamma'$-dihydrodipyridyldicarbamate,

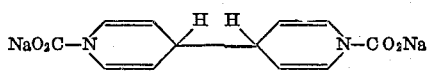

The analysis of the product showed a sodium content of 15.7 and a hydrogen content of 3.6. The theoretical sodium content for the above-named compound is 15.7, while the theoretical hydrogen content is 3.4. This analysis established the composition of the product as disodium $\gamma,\gamma'$-dihydrodipyridyldicarbamate.

EXAMPLE II

A dispersion of sodium and potassium in white oil is prepared by dispersing 34 g. of an eutectic alloy of sodium and potassium in 150 g. of white oil. After the sodium and potassium have been thoroughly dispersed, 250 ml. of anhydrous pyridine are added. An immediate reaction takes place as evidenced by change of color of the solution. The solution is then cooled to $-15°$ C. and stirred for 45 minutes, at which time the mixture is poured over solid carbon dioxide. A precipitate forms in the oil which is a mixture of sodium and potassium salts, and is filtered from the liquid phase, washed with ether, and dissolved in water. The water solution then is washed with ether to remove residual oil and pyridine, and is poured into a large excess of isopropanol, whereupon a white precipitate is formed. This precipitate is recovered by filtration, washed with isopropanol and ether, and dried. The precipitate is a mixture of the sodium and potassium salts of $\gamma,\gamma'$-dihydrodipyridyldicarbamic acid (or N,N'-dipyridyldicarboxylic acid). When dispersions of other alkali metals, such as sodium, potassium, cesium, rubidium, and lithium, in an inert solvent, such as mineral oil, are substituted in this reaction, the corresponding alkali-metal salt of the nitrogen-containing dicarboxylic acid is produced.

EXAMPLE III

A sodium dispersion in xylene is prepared by dispersing 11.5 g. of sodium in 100 g. of xylene. After the dispersion has been cooled to room temperature, 179 g. of acridine dissolved in 250 ml. of anhydrous ether are added. The solution is then cooled to $-40°$ C., and after being stirred at this temperature for 20 minutes, is poured over solid carbon dioxide. The resulting sodium salt is filtered from the liquid phase and washed with ether. Then the salt is dissolved in water and washed with ether to remove residual oil and acridine. The aqueous solution which remains is poured into a large excess of n-butanol, whereupon precipitate is formed. The precipitate is recovered, washed, and dried, and is a $\gamma,\gamma'$-dihydrodiacridyldicarboxylic acid salt of the formula

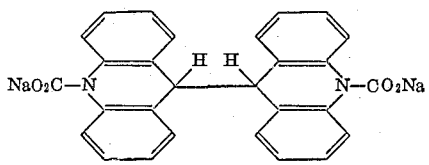

When other heterocyclic aromatic amines are substituted in this process, disodium salts of the corresponding dicarboxylic acids are formed as set forth in Table I.

*Table I*

Aromatic amine reactant    Product

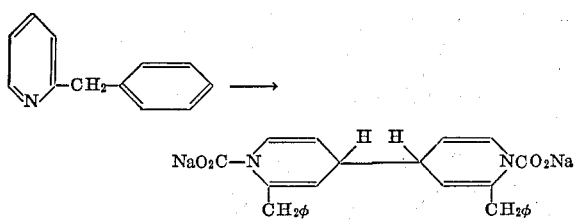

EXAMPLE IV

A sodium dispersion in hydrogenated, aromatic, mineral oil (oil obtained as an extract in the solvent, e.g., phenol, $SO_2$, etc., in the extraction of lubricating oil fractions) was prepared by dispersing 12.5 g. of sodium in 149.6 g. of extract oil. After the dispersion had been cooled to room temperature, 600 ml. of anhydrous pyridine were added, whereupon the solution turned black. The solution was then cooled to −25° C., stirred for 25 minutes, and poured onto solid carbon dioxide. This procedure had been demonstrated in other experiments to produce disodium γ,γ′-dihydrodipyridyldicarbamate, as in Example I.

The flask containing the resulting carbonated material (disodium γ,γ′-dihydrodipyridyldicarbamate) was connected to a vacuum system, and excess pyridine was removed by vacuum stripping, after which sufficient water was added to the mixture to dissolve the salts. The resulting water phase was extracted several times with ether to remove the unreacted oil, and the clear water solution was then acidified by adding hydrochloric acid. Upon addition of acid, a gas (presumably carbon dioxide) was evolved in copious quantities, and a large amount of a polymer was precipitated. The polymer was cream-colored when precipitated, but acquired an orange color upon standing. This polymer was found to have a number of unique properties: (1) It would not dissolve in hot caustic solution, thereby indicating the absence of acidic carboxyl groups. (2) It would not dissolve in excess acid, thereby indicating the absence of basic properties. (3) It decolorized bromine-carbon tetrachloride solutions without liberating hydrogen bromide, and reduced neutral and acidic permanganate solutions, thereby indicating the presence of carbon-to-carbon double bonds. (4) It resisted burning when heated in a flame, but when heated to sufficiently high temperature (not measured) it gave off fumes and left a carbonaceous residue which oxidized without leaving an ash. (5) It was insoluble in heptane, benzene, xylene, ethanol, carbon tetrachloride, ether, and ethyl acetate. (6) It contained nitrogen. This polymer forms gels with water and with various organic liquids, including hydrocarbon dispersions and thus is useful as a gelling agent for various purposes. About 20% wt. of the polymer in mineral oil-water emulsion produces a soft grease which is useful for purposes of lubrication. The polymer may also be used for preparing gasoline gels. Because of the heat-resisting properties of the polymer, it is useful as a pigment in heat-absorbing coatings. The other disodium salts of dicarboxylic acids derived from aromatic heterocyclic amines in the manner described in the foregoing examples also yield useful polymers of the type herein described upon acidification.

EXAMPLE V

When the disodium salts of the dicarboxylic acids produced in accordance with the foregoing examples are reacted with mono- or dihalogenated aliphatic hydrocarbons, there are produced esters of the dicarboxylic acids. Where a mono-halogenated aliphatic hydrocarbon is reacted with these salts, the product obtained is a dihydrocarbyl ester. When a dihalogenated or polyhalogenated aliphatic hydrocarbon is reacted with these salts, the product obtained is a polyester.

In carrying out the reaction of the salts of this invention with hydrocarbyl halides, it is preferred that the reaction be carried out in solution in a nonaqueous solvent, such as ethylene glycol. A typical procedure for the preparation of an ester of the novel dicarboxylic acid salts of this invention is as follows.

A 292-g. portion of disodium γ,γ′-dihydrodipyridyldicarbamate, prepared in accordance with Example I, is dissolved in 1500 g. of ethylene glycol. Then 2 mols (302 g.) of amyl bromide are added, and the mixture is stirred and heated for several hours at the reflux temperature of the amyl bromide. A precipitate of sodium bromide forms slowly, and after the reaction has been completed, the glycol and precipitated bromide are washed out with water. The remaining ester is purified by conventional extraction and distillation techniques. The ester which is produced has the formula,

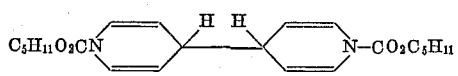

This ester is a liquid which is useful as a plasticizer and which has lubricating properties over a wide temperature range and is thus useful as a synthetic lubricant.

EXAMPLE VI

A 146-g. portion of disodium γ,γ′-dihydrodipyridyldicarbamate, prepared in accordance with Example I, is dissolved in 1000 g. of ethylene glycol. Then 0.5 mol (108 g.) of 1,4-dibromobutane is added, and the mixture is stirred and heated for several hours at a temperature sufficient to reflux the dibromobutane. A precipitate of sodium bromide slowly precipitates from the solution, and the solution becomes viscous as a result of formation of a polyester. After the reaction has been completed, the glycol and sodium bromide are washed out with water, and the resulting ester is purified further by washing and by solvent extraction. The product is a solid thermoplastic material, which is soluble in paint thinners and may be used as a base for alkyd-type paints.

EXAMPLE VII

A 292-g. portion of disodium γ,γ′-dihydrodipyridyldicarbamate, prepared in accordance with Example I, is dissolved in 1500 g. of ethylene glycol. Then 2 mols of allyl chloride are added and the mixture is stirred and heated for several hours at a temperature sufficient to reflux the allyl chloride. In this reaction, however, care must be exercised to exclude air from the reaction chamber to avoid reaction at the double bonds of the allyl chloride. The reaction goes to completion over a period of several hours, with by-product sodium bromide precipitating from the solution. After the reaction has been completed, the glycol and precipiated sodium bromide are washed out with water and the resulting ester is further purified by conventional procedures. This ester is useful as a cross-linking ingredient in thermosetting resins, and may be mixed with thermoplastic resins to cause them to harden partially with heat. In preparing esters and polyesters in accordance with this invention, any halogenated hydrocarbon of 1 to 20 carbon atoms per molecule may be used. The halogenated hydrocarbon may be saturated or unsaturated, straight-chain or branched-chain, acyclic or alicyclic, or mixed.

While we have described this invention fully and completely with special emphasis upon several preferred embodiments thereof, as required by the patent laws, we wish it to be understood that within the scope of the appended claims this invention may be practiced otherwise than as specifically described herein.

The embodiments of the invention in which an exclusive property or privilege is claimed are defined as follows:

1. A polymer produced by reaction of a strong mineral acid in aqueous solution with a compound selected from the group consisting of

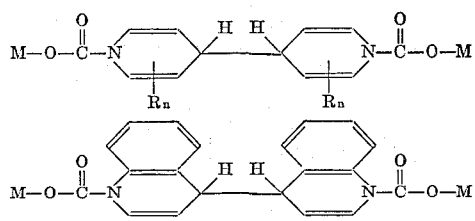

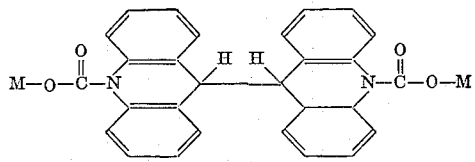

and

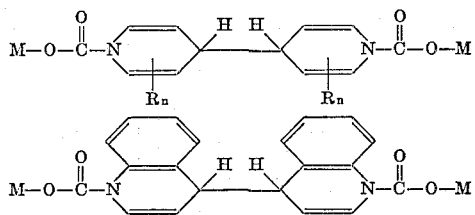

wherein M is an alkali metal, R is an unsubstituted lower alkyl radical and $n$ in an integer from 0 to 3, the substituents on both rings being identical.

2. A method of producing polymers which comprises acidifying a compound selected from the class consisting of

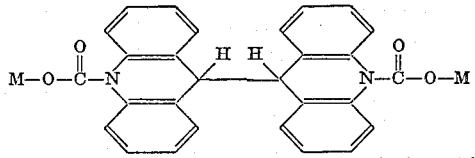

and

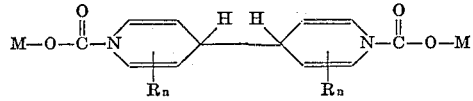

wherein M is an alkali metal, R is an unsubstituted lower alkyl radical and $n$ is an integer from 0 to 3, the substituents on both rings being identical, with a strong mineral acid in aqueous solution.

3. A method of producing polymers which comprises acidifying a compound of the formula

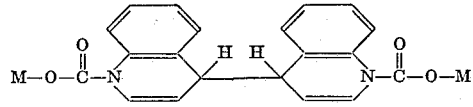

wherein M is an alkali metal, R is an unsubstituted lower alkyl radical and $n$ is an integer from 0 to 3, the substituents on both rings being identical, with a strong mineral acid in aqueous solution.

4. A method of producing polymers which comprises acidifying a compound of the formula

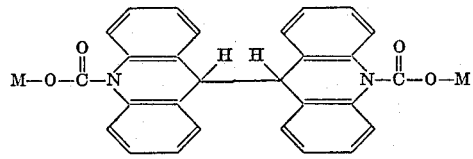

wherein M in as alkali metal, with a strong mineral acid in aqueous solution.

5. A method of producing polymers which comprises acidifying a compound of the formula

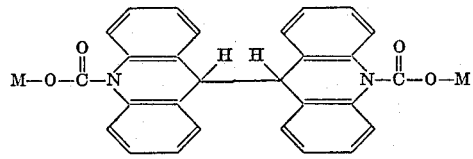

wherein M is an alkali metal, with a strong mineral acid in aqueous solution.

References Cited by the Examiner
UNITED STATES PATENTS
3,147,262  9/1964  Kramer et al. _____ 260—2

SAMUEL H. BLECH, *Primary Examiner.*